(12) United States Patent
Maness et al.

(10) Patent No.: US 11,229,932 B2
(45) Date of Patent: Jan. 25, 2022

(54) PHARMACEUTICAL WASTE SYSTEM

(71) Applicant: Stryker Corporation, Kalamazoo, MI (US)

(72) Inventors: David A. Maness, Mt. Pleasant, SC (US); Brian James Vanderwoude, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 246 days.

(21) Appl. No.: 16/324,273

(22) PCT Filed: Sep. 8, 2017

(86) PCT No.: PCT/US2017/050648
§ 371 (c)(1),
(2) Date: Feb. 8, 2019

(87) PCT Pub. No.: WO2018/049139
PCT Pub. Date: Mar. 15, 2018

(65) Prior Publication Data
US 2019/0217352 A1    Jul. 18, 2019

Related U.S. Application Data

(60) Provisional application No. 62/430,623, filed on Dec. 6, 2016, provisional application No. 62/385,746, filed on Sep. 9, 2016.

(51) Int. Cl.
*B09B 3/00* (2006.01)
*C02F 103/34* (2006.01)

(52) U.S. Cl.
CPC .......... *B09B 3/0075* (2013.01); *B09B 3/0016* (2013.01); *C02F 2103/343* (2013.01)

(58) Field of Classification Search
CPC ....... B09B 3/00; B09B 3/0075; B09B 3/0016; C02F 2103/343
USPC ...................................................... 588/313
See application file for complete search history.

(56) References Cited

U.S. PATENT DOCUMENTS

| | | | |
|---|---|---|---|
| 5,167,635 | A | 12/1992 | Haber et al. |
| 8,838,395 | B2 | 9/2014 | Matsiev et al. |
| 9,044,377 | B2 | 6/2015 | Maness |
| 9,456,954 | B2 | 10/2016 | Maness |
| 10,046,993 | B2 | 8/2018 | Sanborn et al. |
| 2008/0179257 | A1 | 7/2008 | Clarke |
| 2009/0048555 | A1 | 2/2009 | Stryker et al. |
| 2009/0283409 | A1 | 11/2009 | Stern et al. |
| 2012/0305132 | A1 | 12/2012 | Maness |
| 2014/0209550 | A1 | 7/2014 | Pryor et al. |

FOREIGN PATENT DOCUMENTS

| | | |
|---|---|---|
| CN | 104582744 A | 4/2015 |
| EP | 2359879 A2 | 8/2011 |
| JP | 2013542414 A | 11/2013 |
| JP | 2016505372 A | 2/2016 |
| WO | 2014028307 A1 | 2/2014 |
| WO | 2015033218 A1 | 3/2015 |

OTHER PUBLICATIONS

English language abstract for JP 2013-542414 A extracted from espacenet.com database on Apr. 8, 2021, 2 pages.
English language abstract for JP 2016-505372 A extracted from espacenet.com database on Apr. 8, 2021, 2 pages.
International Search Report for Application No. PCT/US2017/050648 dated Mar. 6, 2018, 4 pages.
Cardinal Health, "A Safe, Simple and Economical Solution SAF-T Pump Waste Disposal System", Mar. 30, 2017, XP055454283, downloaded from http://www.cardinalhelath.com/content/dam/corp/web/documents/brochure/CARDINAL-HEALTH.Fluid-Management-SAF-T-Pump-Waste-Disposal-System-Brochure.pdf, 6 pages.
Deterra System, "Deterra System Webpage", https://deterrasystem.com/, 2017, 2 pages.
Abstract of Neel, Scott et al., "Can Successful Implementation of the Common Canister Program Deliver Cost Containment and Improved Infection Control?", Hospital Pharmacy, Sep. 1, 2012, XP055454287, downloaded from https://web.archive.org/web/20151003045238/http://www.cardinalhealth.com/en/product-solutions/medical/infection-control/fluid-management/saf-t-pump-system.html, 2 pages.
Primozone Production AB, "Removal of Micropollutants Such as Pharmaceutical Residue from Wastewater", http://primozone.com/municipal/pharmaceutical-residue/, 2017, 3 pages.
Abstract of Science Direct, "New Standard for Hospital Wastewater Treatment", Jun. 30, 2015, XP055454367, downloaded from https://www.sciencedirect.com/science/article/pii/S0015188215301415, 1 page.

(Continued)

*Primary Examiner* — Edward M Johnson
(74) *Attorney, Agent, or Firm* — Howard & Howard Attorneys PLLC

(57) ABSTRACT

A pharmaceutical waste system for treating a residual pharmaceutical composition disposed in a pharmaceutical dispenser includes an extraction stage, a pharmaceutical dispenser coupler, and a pharmaceutical waste treatment stage. The extraction stage is in fluid communication with the pharmaceutical dispenser and is configured to extract at least a portion of the residual pharmaceutical composition from the pharmaceutical dispenser. The pharmaceutical dispenser coupler is configured to couple the pharmaceutical dispenser to the extraction stage. The pharmaceutical waste treatment stage is in fluid communication with the extraction stage and is configured to change the residual pharmaceutical waste composition extracted from the pharmaceutical dispenser in one of a chemical and physical manner. The present disclosure also provides a method of disposing of a residual pharmaceutical composition from a pharmaceutical dispenser.

14 Claims, 8 Drawing Sheets

(56) References Cited

OTHER PUBLICATIONS

Stericycle, "Regulated Waste Disposal & Compliance Solutions Webpage", https://www.stericycle.com/, 2017, 9 pages.
Stryker, "Pharma Lock OR Controlled Substance Waste Management System Instructions for Use", REF 0085-002-001, Apr. 2017, 14 pages.
Stryker, "Smart Sink Controlled Substance Waste Management System Instructions for Use", REF 0085-000-000/0085-001-700, Apr. 2017, 29 pages.
Verde Technologies, Inc., "Deterra Drug Deactivation System Brochure", https://deterrasystem.com/wp-content/uploads/2015/01/Deterra-Backgrounder-FINAL.pdf, 2017, 2 pages.
English language abstract for CN 104582744 A extracted from espacenet.com database on Aug. 9, 2021, 2 pages.

PHARMACEUTICAL WASTE SYSTEM

CROSS-REFERENCE TO RELATED APPLICATIONS

This application is a National Stage entry of International Patent Application No. PCT/US2017/050648, filed on Sep. 8, 2017, which claims priority to and all the benefits of U.S. Provisional Patent Application No. 62/385,746, filed on Sep. 9, 2016 and U.S. Provisional Patent Application No. 62/430,623, filed on Dec. 6, 2016 the entire contents of each of which are hereby incorporated by reference.

TECHNICAL FIELD

The present disclosure relates generally to pharmaceutical waste systems and a method of disposing of residual pharmaceutical compositions.

BACKGROUND

Pharmaceutical compositions, e.g., fluid pharmaceutical compositions or solid pharmaceutical compositions, are often utilized to help patients during medical procedures or to otherwise assist with the management of pain or other symptoms. Pharmaceutical compositions comprise a pharmaceutical drug that may be used to diagnose patients, treat medical conditions that patients may have, cure medical conditions that patients may have, immunize patients against certain diseases, manage pain levels felt by patients, or otherwise provide some medical benefit to patients. Pharmaceutical compositions are often provided to patients from many different types of pharmaceutical dispensers. For example, acute care and other medical facilities often use such pharmaceutical compositions that can be provided from an intravenous (IV) bag, a cassette or cartridge, a bottle, a mixing vial, a syringe, or some other type of pharmaceutical dispenser. Additionally, such pharmaceutical compositions can be subject to patient control, i.e. patient-controlled analgesia (PCA), or can be fully controlled by a licensed medical professional.

Once the patient no longer needs the pharmaceutical composition, it is desired that any remainder of the pharmaceutical composition, at this time referred to as a residual pharmaceutical composition, be disposed of in a proper manner. Proper and timely disposal of the residual pharmaceutical composition can effectively inhibit any undesired pharmaceutical drug diversion (i.e., stealing of pharmaceutical drugs) and/or improper or potentially dangerous usage or ingestion of the residual pharmaceutical composition. Thus, there is a need for a pharmaceutical waste system for treating a residual pharmaceutical composition disposed in a pharmaceutical dispenser.

SUMMARY

In one embodiment, a pharmaceutical waste system for treating a residual pharmaceutical composition disposed in a pharmaceutical dispenser is provided. The pharmaceutical waste system comprises an extraction stage in fluid communication with the pharmaceutical dispenser. The extraction stage is configured to extract at least a portion of the residual pharmaceutical composition from the pharmaceutical dispenser. The pharmaceutical waste system further comprises a pharmaceutical dispenser coupler. The pharmaceutical dispenser coupler is configured to couple the pharmaceutical dispenser to the extraction stage. The pharmaceutical waste system further comprises a pharmaceutical waste treatment stage in fluid communication with the extraction stage. The pharmaceutical waste treatment stage is configured to change the residual pharmaceutical composition extracted from the pharmaceutical dispenser in one of a chemical and physical manner.

The present disclosure also provides a method of disposing of a residual pharmaceutical composition from a pharmaceutical dispenser. The method comprises coupling the pharmaceutical dispenser to a pharmaceutical dispenser coupler. The method further comprises extracting at least a portion of the residual pharmaceutical dispenser composition from the pharmaceutical dispenser through the pharmaceutical dispenser coupler. The method further comprises treating at least a portion of the extracted pharmaceutical composition in one of a chemical and physical manner.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
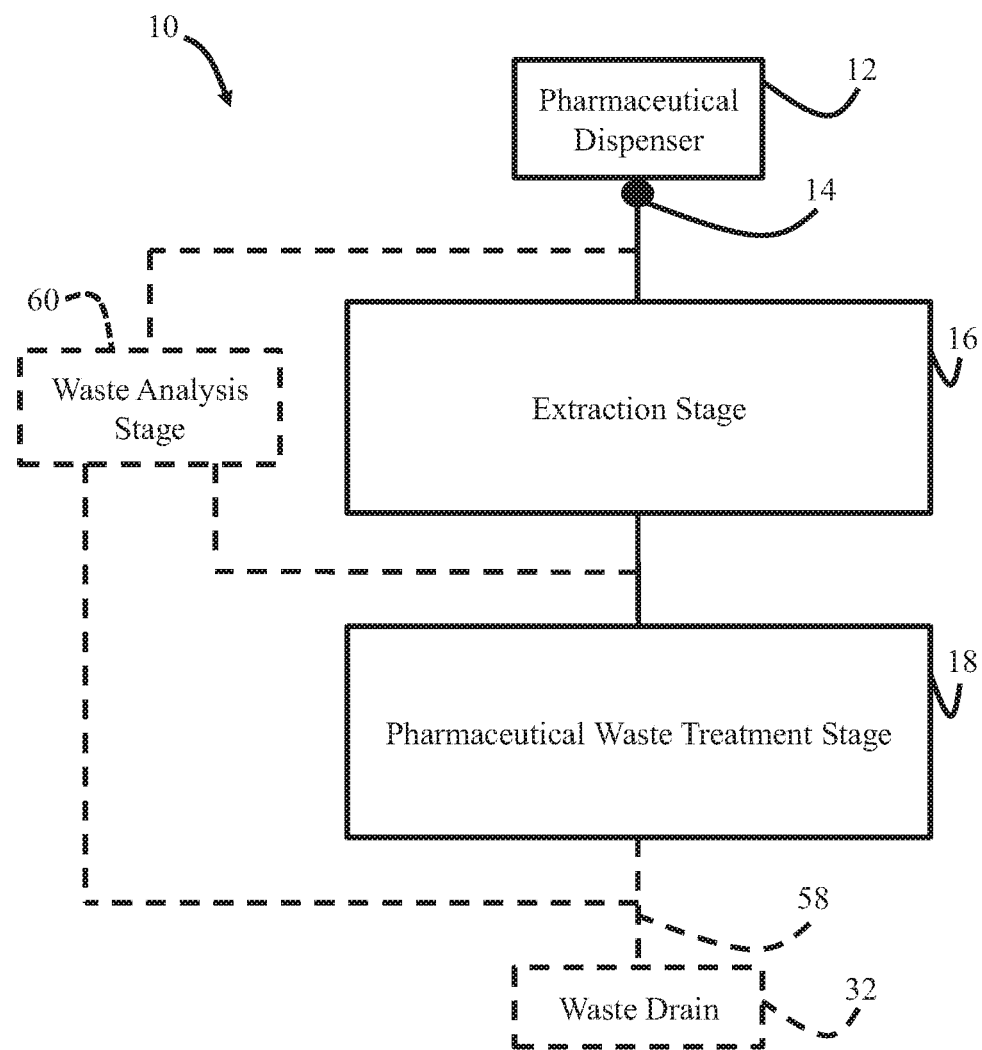
FIG. 1 is a schematic illustration of pharmaceutical waste system according to one embodiment.

With reference to FIG. 1, a pharmaceutical waste system 10 for treating a residual pharmaceutical composition disposed in a pharmaceutical dispenser 12 is provided. The pharmaceutical waste system 10 may comprise a pharmaceutical dispenser coupler 14, an extraction stage 16, and a pharmaceutical waste treatment stage 18.

It should be appreciated that any stages and/or components of the pharmaceutical waste system may be in fluid communication with each other via one or more fluid conduits. It should be appreciated that the design of the fluid conduits is not particularly limited, and that the fluid conduits may assume any suitable configuration. By way of non-limiting example, the fluid conduits may be pipes, tubes, lines, or any other type of fluid conduit suitable for transferring the residual pharmaceutical composition therein from one component to another, and/or one stage to another.

With reference again to FIG. 1, in certain embodiments, the pharmaceutical dispenser 12 may be any type of pharmaceutical dispenser suitable for dispensing a pharmaceutical composition, such as to a patient, subject, or other target device. Pharmaceutical compositions may comprise a pharmaceutical drug that may be used to diagnose patients, treat medical conditions that patients may have, cure medical conditions that patients may have, immunize patients against certain diseases, manage pain levels felt by patients, or otherwise provide some medical benefit to patients. The pharmaceutical composition may take the form of a fluid, gel, emulsion, powder, capsule, tablet, or any other suitable form. The pharmaceutical dispenser 12 may be an intravenous (IV) bag, a cassette or cartridge, a bottle, a mixing vial, and/or a syringe. Of course, still other types of pharmaceutical dispensers are contemplated. In other embodiments, other forms of liquid medical waste may be treated using the pharmaceutical waste system described herein.

The pharmaceutical dispenser may include a dispenser outlet suitable for outputting the pharmaceutical composition. The dispenser outlet may take any suitable form to facilitate quick and efficient coupling with the pharmaceutical dispenser coupler. In one embodiment, the dispenser outlet may be a luer lock fitting. In this manner, the pharmaceutical dispenser may be quickly coupled to the pharmaceutical dispenser such that the pharmaceutical composition may be removed from the pharmaceutical dispenser without risk of leakage. Of course, still other dispenser outlets that facilitate quick and efficient coupling are contemplated.

In some embodiments, the pharmaceutical dispenser may comprise a locking mechanism or other valve (not shown) operably connected to the dispenser outlet to lock the residual pharmaceutical composition within the pharmaceutical dispenser. In this manner, the pharmaceutical dispenser advantageously mitigates the risk of drug diversion within a healthcare facility by preventing unauthorized access to the residual pharmaceutical composition disposed within the pharmaceutical dispenser. It should be appreciated that the design of the locking mechanism is not particularly limited.

With reference again to FIG. 1, the pharmaceutical dispenser coupler 14 is configured to couple the dispenser outlet of the pharmaceutical dispenser 12 to the extraction stage 16. The pharmaceutical dispenser coupler 14 may be any coupler suitable to allow fluid communication between the outlet of the pharmaceutical dispenser 12 and the extraction stage 16, and to facilitate quick and efficient coupling with the outlet of the pharmaceutical dispenser 12. It should be appreciated that the pharmaceutical dispenser coupler 14 can be configured to accommodate any number and/or types of pharmaceutical dispensers.

Figure 2A:
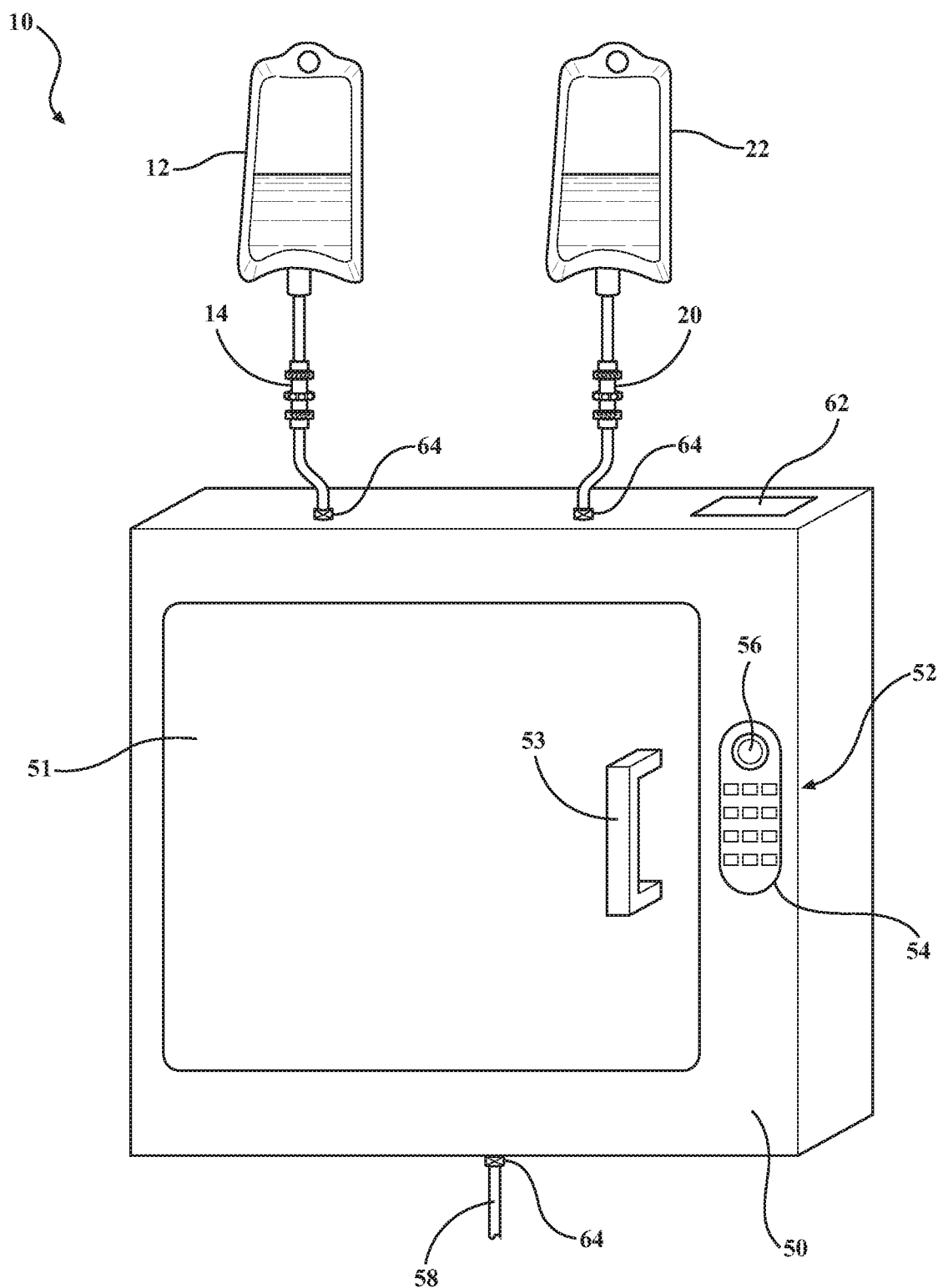
FIG. 2A is a perspective view of another embodiment of a pharmaceutical waste system including a main housing.
Figure 2B:
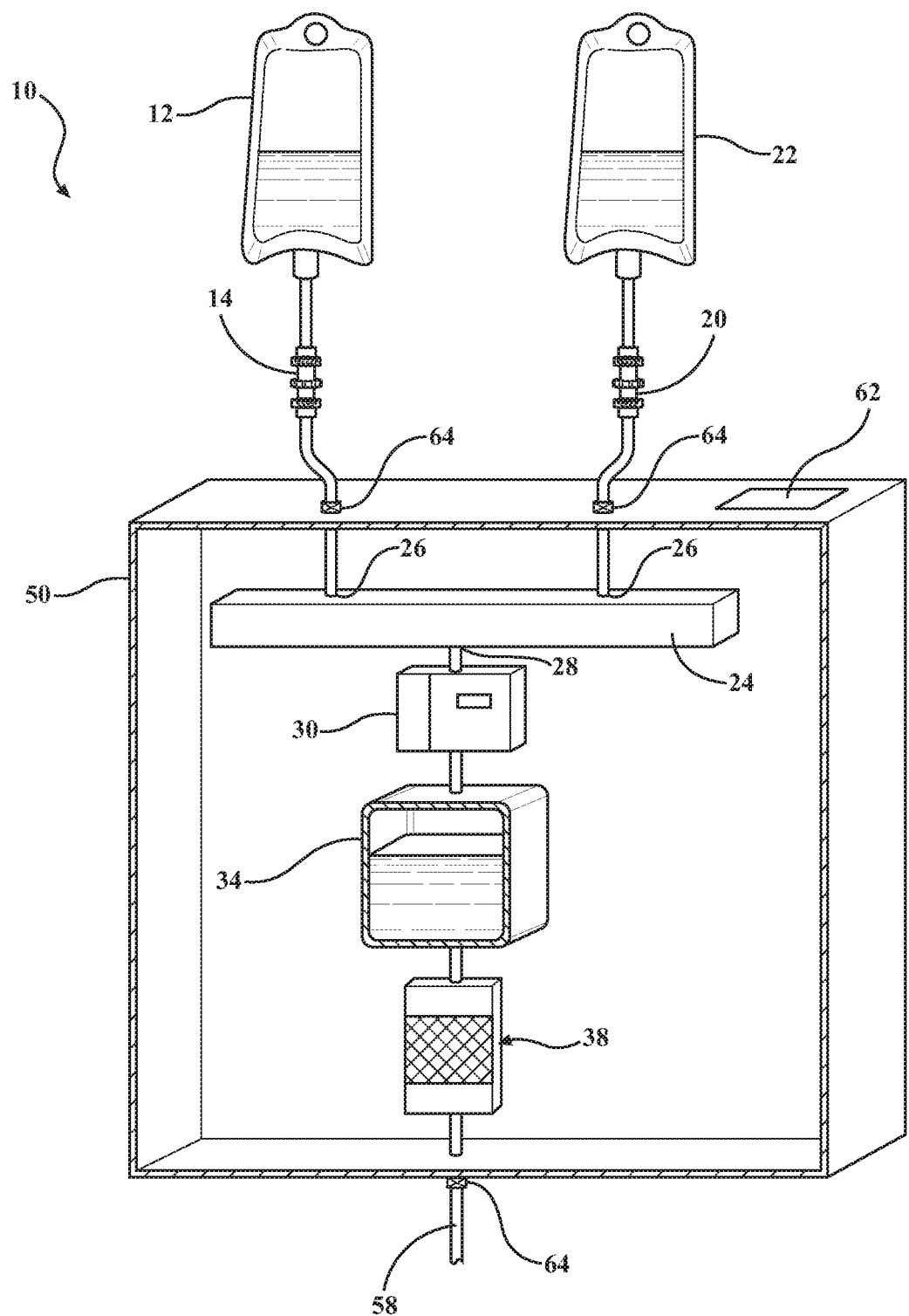
FIG. 2B is a perspective view of the pharmaceutical waste system of FIG. 2A having a front wall of the main housing not shown.

When the pharmaceutical dispenser 12 is an IV bag 12, as shown in FIGS. 2A and 2B, the pharmaceutical dispenser coupler 14 may be a luer lock coupler 14. In this manner, a patient care provider can couple the outlet of the pharmaceutical dispenser 12 to the luer lock coupler 14 such that the residual pharmaceutical composition disposed within the pharmaceutical dispenser 12 does not leak when the residual pharmaceutical composition is extracted from the pharmaceutical dispenser 12. The luer lock coupler 14 may be a male-male, male-female, female-male, or female-female luer lock coupler based on the configuration of the outlet of the pharmaceutical dispenser 12 and an inlet port of the extraction stage 16.

In some embodiments, the pharmaceutical dispenser coupler may be configured to form a fluid tight connection with the outlet of the pharmaceutical dispenser and a fluid conduit fitting with any fluid conduit of the pharmaceutical waste system. In this manner, the pharmaceutical dispenser coupler facilities quick and efficient coupling with the outlet of the pharmaceutical dispenser and the fluid conduits of the pharmaceutical waste system. The pharmaceutical dispenser coupler may assume any suitable design configured to form a secure, leak-free connection for the transfer of fluids or gasses between two devices or objects such as needles, trocars, syringes, or other gas/fluid delivery systems.

It is contemplated that the pharmaceutical dispenser coupler may be configured to couple more than one pharmaceutical dispenser to the extraction stage at one time. It is also contemplated that the pharmaceutical waste system may comprise any number of pharmaceutical dispenser couplers necessary to couple a corresponding number of pharmaceutical dispensers to the extraction stage at the one time. As but one example, if the patient care provider desired to couple three pharmaceutical dispensers to the extraction stage at one time, the pharmaceutical waste system may comprise three pharmaceutical dispenser couplers.

Figure 3:
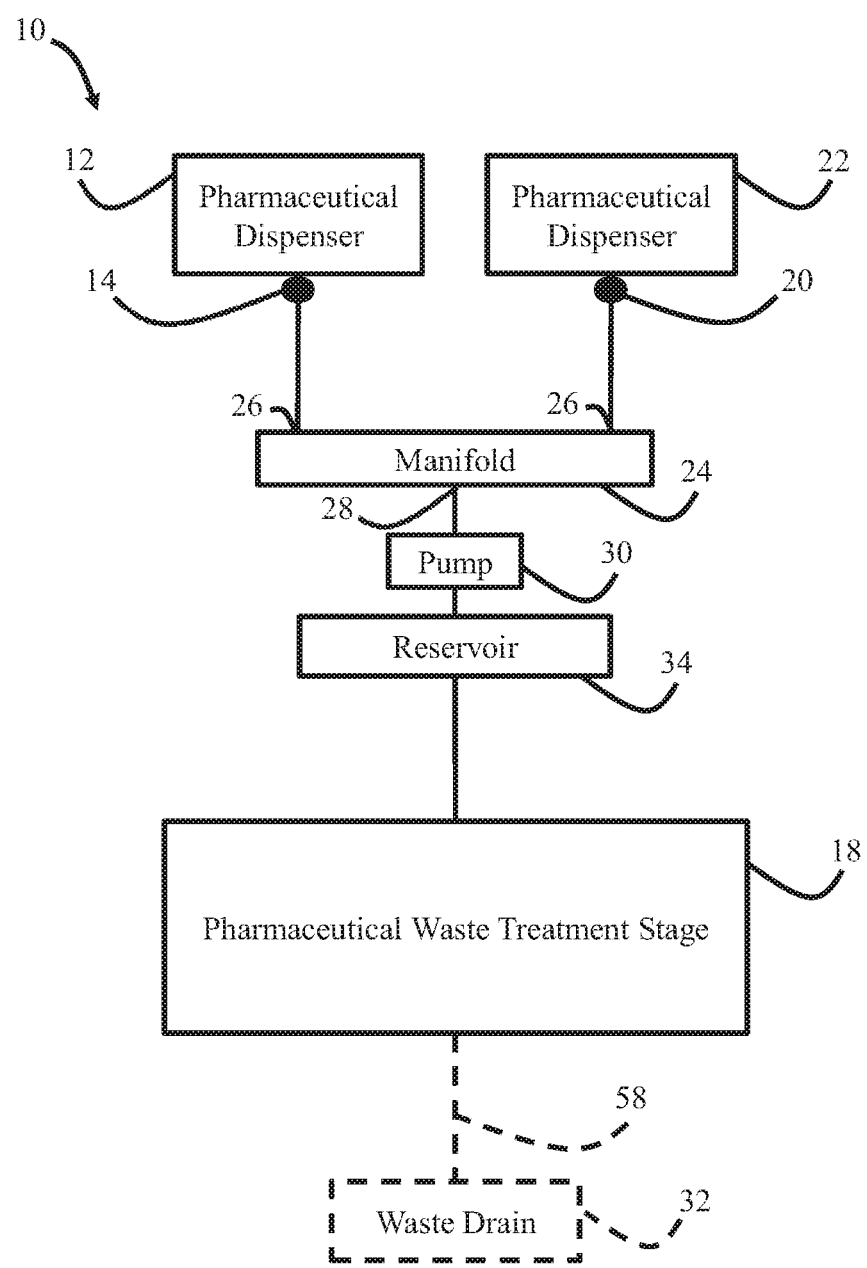
FIG. 3 is a schematic illustration of another embodiment of a pharmaceutical waste system including a manifold, a pump, and a reservoir.

In one embodiment, as shown in FIGS. 2A, 2B, and 3, the pharmaceutical dispenser coupler 14 may be further defined as a first pharmaceutical dispenser coupler 14, and the pharmaceutical waste system 10 may comprise a second pharmaceutical dispenser coupler 20 that is configured to a couple a second pharmaceutical dispenser 22. The second pharmaceutical dispenser coupler 20 may be the same as, or different from, the first pharmaceutical dispenser coupler 14. For example, as shown in FIGS. 2A and B, the first and second pharmaceutical dispenser couplers 14, 20 may each be luer lock couplers 14, 20.

With reference again to FIG. 1, the extraction stage 16 is in fluid communication with the pharmaceutical dispenser 12. The extraction stage 16 is configured to extract at least a portion of the residual pharmaceutical composition from the pharmaceutical dispenser 12.

As shown in FIGS. 2B and 3, in some embodiments, the extraction stage may further comprise a manifold 24. The manifold 24 is configured to be placed in fluid communication with the one or more pharmaceutical dispensers 12, 22. When present, the manifold 24 comprises one or more manifold inlets 26 and a manifold outlet 28. The one or more manifold inlets 26 are configured to receive the residual pharmaceutical composition from a corresponding number of pharmaceutical dispensers 12, 22 through the pharmaceutical dispenser couplers 14, 20. The manifold outlet 28 is configured to output the residual pharmaceutical composition received from the pharmaceutical dispensers 12, 22. Of course, it is contemplated that the manifold may comprise any number of manifold outlets necessary for outputting the residual pharmaceutical composition received from the pharmaceutical dispensers.

With reference to FIG. 2B, in the illustrated embodiment, the manifold 24 comprises two manifold inlets 26. Each manifold inlet 26 is coupled to one of the first and second pharmaceutical dispensers 12, 22. In this manner, the manifold 24 advantageously facilitates simultaneous extraction of the residual pharmaceutical composition disposed within the first and second pharmaceutical dispensers 12, 22.

With reference to FIGS. 2B and 3, in some embodiments, the extraction stage may further comprise a pump 30 in fluid communication with the first and second pharmaceutical dispenser couplers 14, 20 and, therefore, the first and second pharmaceutical dispensers 12, 22. When present, the pump 30 is configured to selectively extract the residual pharmaceutical composition from the first and second pharmaceutical dispensers 12, 22.

With reference to FIG. 3, the pump 30 may further be configured to pump the residual pharmaceutical composition to the pharmaceutical waste treatment stage 18. The pump 30 may further be configured to pump the residual pharmaceutical composition to a waste drain 32 after the residual pharmaceutical composition is treated. In other words, when present, the pump 30 advantageously facilitates quick and efficient extraction of the residual pharmaceutical composition from the pharmaceutical dispenser to the extraction stage, transfer of the residual pharmaceutical composition from the extraction stage to the pharmaceutical waste treatment stage 18, and/or disposal of the residual pharmaceutical composition after treatment. In some embodiments, the pump 30 may be controlled by a controller (not shown) of the pharmaceutical waste system that will described in detail below. It is also contemplated that the pharmaceutical waste system may include more than one pump.

The pump may assume any suitable configuration or design suitable for extracting the residual pharmaceutical composition from the pharmaceutical dispensers in fluid communication with the extraction stage. By way of example, the pump may be a rotary-type positive displacement pump (such as a gear pump or a screw pump), a reciprocating-type positive displacement pump (such as a plunger pump, a diaphragm pump or a piston pump), a linear-type positive displacement pump (such as a rope pump or a chain pump), an impulse pump (such as a hydraulic ram pump, a pulser pump or an airlift pump), a velocity pump, a radial-flow pump, an axial-flow pump, or a gravity pump. Of course, still other pump configurations are contemplated.

In some embodiments, the extraction stage may further comprise an extraction device (not shown). When present, the extraction device may be configured to assist with extraction of the residual pharmaceutical composition from the pharmaceutical dispenser. It should be appreciated that the design of the extraction device is not particularly limited, and that the extraction device may assume any suitable configuration. By way of non-limiting example, when the pharmaceutical dispenser is a syringe, the extraction device may be a syringe pump. In this manner, the syringe pump may be configured to extract the contents of the syringe to the extraction stage over a predetermined time period. In other embodiments, the extraction device may comprise a grinder to convert solid residual pharmaceutical compositions to a liquid in order to facilitate compatibility of solid residual pharmaceutical compositions with the pharmaceutical waste treatment system. In still other embodiments, when the pharmaceutical dispenser is an IV bag, the extraction device may comprise a compression device, such as a press, that is configured to compress the IV bag to facilitate faster and more efficient extraction of the residual pharmaceutical composition from the IV bag.

With reference again to FIG. 3, in some embodiments, the extraction stage may comprise a reservoir 34. The reservoir 34 may be in fluid communication with the pharmaceutical waste treatment stage 18. When present, the reservoir 34 is upstream of the pharmaceutical waste treatment stage 18 for temporarily storing the residual pharmaceutical composition extracted from the first and second pharmaceutical dispensers 12, 22. The reservoir 34 may have any volume suitable for temporarily storing the residual pharmaceutical composition before the pharmaceutical waste treatment stage 18 changes the residual pharmaceutical composition in one of a chemical and physical manner. In some instances, the pharmaceutical waste treatment stage 18 may require additional time to change the residual pharmaceutical composition in one of a chemical and physical manner before receiving more of the residual pharmaceutical composition form the extraction stage. The reservoir 34 advantageously allows the additional time required by the pharmaceutical waste treatment stage 18 to elapse by temporarily storing the residual pharmaceutical waste composition extracted from the pharmaceutical dispensers 12, 22. The reservoir 34 further advantageously allows for quick and efficient extraction of the residual pharmaceutical composition disposed within the pharmaceutical dispensers 12, 22 by providing storage for the residual pharmaceutical composition after extraction. In this manner, the reservoir 34 mitigates the risk of drug diversion within the healthcare facility and also reduces the likelihood that the pharmaceutical waste treatment stage 18 fails to change the residual pharmaceutical composition in one of a chemical and physical manner. Furthermore, because the pharmaceutical waste treatment stage 18 may take longer to treat the residual pharmaceutical composition than the extraction stage takes to extract the residual pharmaceutical composition from the pharmaceutical dispensers 12, 22, the reservoir 34 ensures that persons seeking to dispose of the residual pharmaceutical composition do not need to wait for the residual pharmaceutical composition to be treated. The reservoir 34 may be located physically above the pharmaceutical waste treatment stage such that gravity at least partially causes fluid to flow from the reservoir to and/or through the pharmaceutical waste treatment stage 18.

As shown in FIG. 2B, in one embodiment, the pharmaceutical waste treatment stage comprises a filter assembly 38 that will be described in detail below, and the reservoir 34 is in fluid communication with the filter assembly 38.

With reference again to FIGS. 2B and 3, in the illustrated embodiments, the reservoir 34 is located downstream of the manifold 24, and the pump 30. However, it is contemplated that the reservoir 34 may be located at any position relative to the pump 30 and manifold 24 that facilitates temporary storage of the residual pharmaceutical composition extracted from the pharmaceutical dispensers 12, 22 before waste treatment.

With reference again to FIG. 1, the pharmaceutical waste treatment stage 18 is in fluid communication with the extraction stage 16. The pharmaceutical waste treatment stage 18 is configured to change the residual pharmaceutical composition extracted from the pharmaceutical dispenser in one of a chemical and physical manner.

Figure 4:
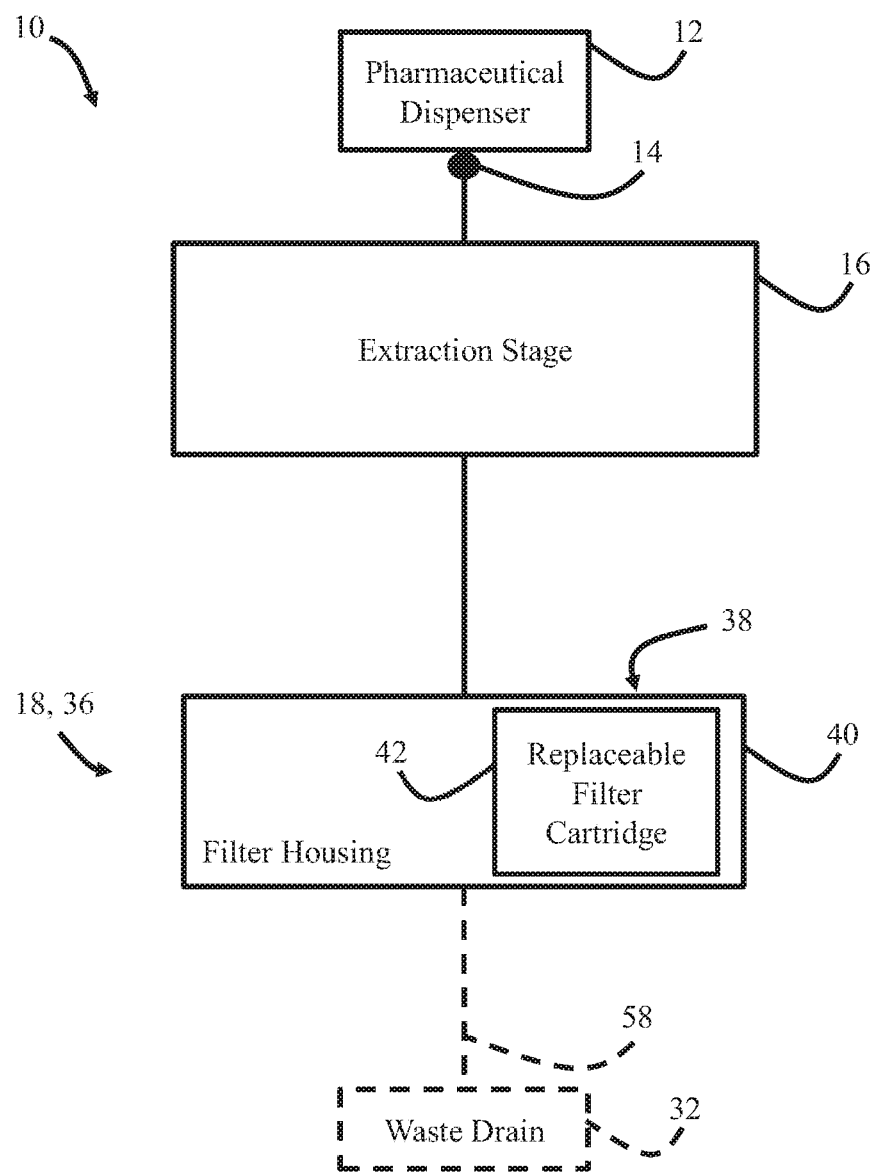
FIG. 4 is a schematic illustration of another embodiment of a pharmaceutical waste system including a separation stage.

In some embodiments, as shown in FIG. 4, the pharmaceutical waste treatment stage 18 is further defined as a separation stage 36. The separation stage 36 is configured to separate the residual pharmaceutical composition extracted from the pharmaceutical dispenser 12 into a purified waste portion and a contaminated waste portion. In the context of this disclosure, the purified waste portion refers to a portion of the residual pharmaceutical composition that is free, or substantially free, of any pharmaceutical drugs after the residual pharmaceutical composition is changed in one of a chemical and physical manner. In the context of this disclosure, the contaminated waste portion refers to a portion of the residual pharmaceutical composition that contains all, or substantially all, of the pharmaceutical drugs of the residual pharmaceutical composition after the residual pharmaceutical composition is changed in one of a chemical and physical manner. It should be appreciated that the contaminated waste portion may be sequestered in a chemical composition, such as a binding agent as will be described below.

With continued reference to FIG. 4, the separation stage 36 may further comprise a filter assembly 38. The filter assembly 38 may further comprise a filter housing 40. It should be appreciated that the design of the filter housing 40 is not particularly limited, and that the filter housing 40 may assume any suitable configuration.

The filter assembly 38 may further comprise a filter media (not shown). The filter media is disposed within the filter housing 40. When present, the filter media is configured to bind with at least a portion of the residual pharmaceutical composition extracted from the pharmaceutical dispenser 12 such that the filter media retains the contaminated waste portion. In other words, the filter media is configured to bind at least a portion of any pharmaceutical drugs of the residual pharmaceutical composition. In this manner, the filter media may render the pharmaceutical drugs of the residual pharmaceutical composition unrecoverable. In the context of this disclosure, the term unrecoverable means that any pharmaceutical drugs of the residual pharmaceutical composition have been altered chemically and/or physically such that the pharmaceutical drugs are no longer usable to provide their previous function, to perform their previously potential purpose, and/or their medical benefit. As such, the filter media advantageously mitigates the risk of drug diversion within the healthcare facility.

The filter media may comprise any binding agent suitable for binding at least a portion of the residual pharmaceutical composition. By way of non-limiting example, the filter media may comprise zeolites, clays, silica gel, aluminum oxide, carbon, activated charcoal, and combinations thereof. In one embodiment, the filter media comprises activated charcoal. Of course, still other binding agents are contemplated.

With reference again to FIG. 4, in some embodiments, the filter assembly 38 may further comprise a replaceable filter cartridge 42. The replaceable filter cartridge 42 is removably coupled to the filter housing 40. When the replaceable filter cartridge 42 is present, the filter media is disposed within the replaceable filter cartridge 42. In this manner, when the filter media is no longer able to effectively bind any pharmaceutical drugs of the residual pharmaceutical composition, the patient care provider can quickly and efficiently replace the replaceable filter cartridge 42.

The replaceable filter cartridge 42 may be disposed of in any suitable manner. For example, the replaceable filter cartridge 42 may be disposed of with regular garbage, taken by a regulated waste company, returned, and destroyed by incineration, etc. Additionally, in certain embodiments, the replaceable filter cartridge 42 may be collected, registered, and accumulated in quantities for final return and/or disposal. In such embodiments, the replaceable filter cartridge 42 may further comprise serial numbers, RFID chips, transponders, or other forms of identification for tracking purposes.

In some embodiments, the extraction stage may comprise more than one filter assembly such that each corresponding filter media is configured to bind with a different portion of the residual pharmaceutical composition.

Figure 5:
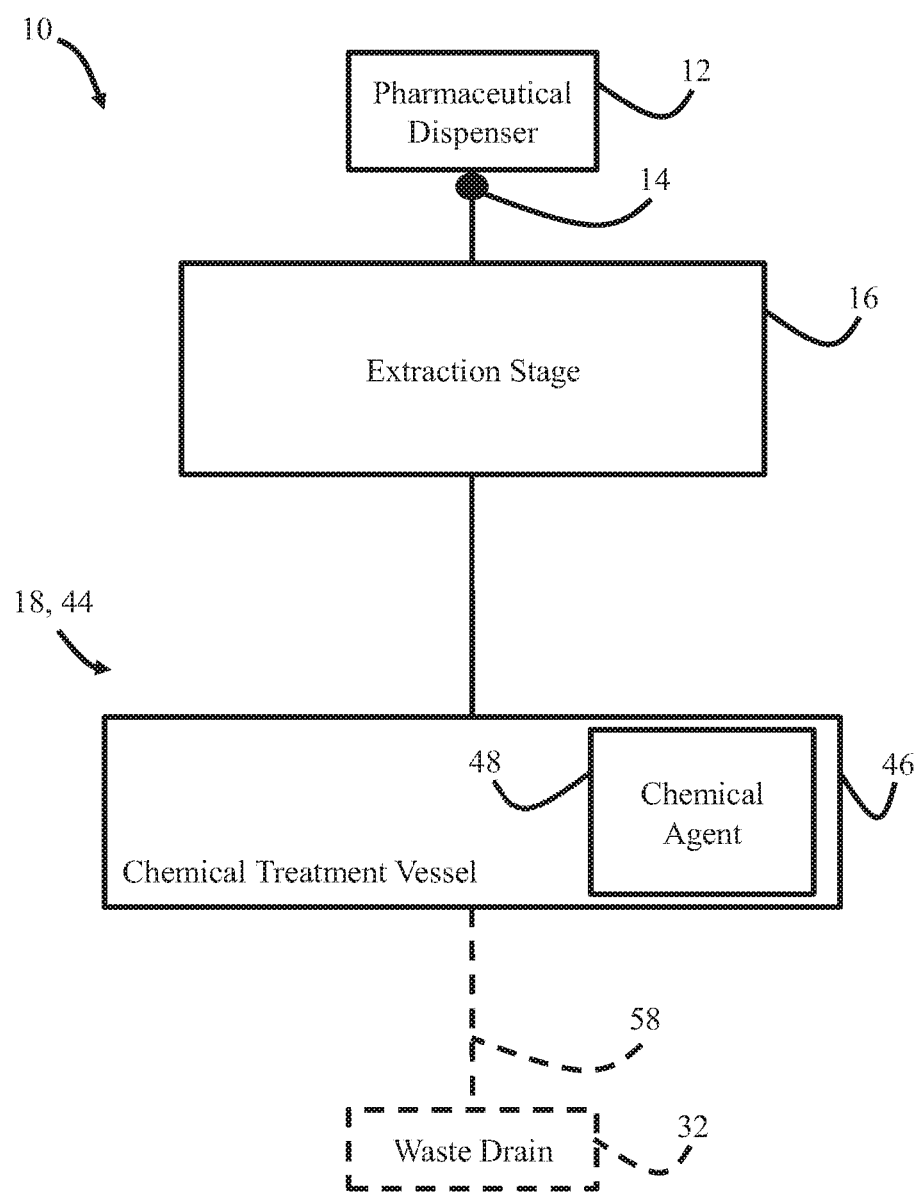
FIG. 5 is a schematic illustration of another embodiment of a pharmaceutical waste system including a chemical treatment stage.

With reference to FIG. 5, in some embodiments, the pharmaceutical waste treatment stage 18 may be further defined as a chemical treatment stage 44. The chemical treatment stage 44 is configured to treat the residual pharmaceutical composition extracted from pharmaceutical dispenser 12 in a chemical manner. In the context of this disclosure, the term treat the residual pharmaceutical composition in a chemical manner means to chemically deactivate, denature, oxidize, or otherwise change any pharmaceutical drugs of the residual pharmaceutical composition such that the pharmaceutical drugs are unrecoverable. As such, the chemical treatment stage 44 advantageously mitigates the risk of drug diversion within the healthcare facility.

With continued reference to FIG. 5, in some embodiments, the chemical treatment stage 44 may further comprise a chemical treatment vessel 46. It should be appreciated that the design of the chemical treatment vessel 46 is not particular limited, and that the chemical treatment vessel 46 may assume any suitable configuration.

In some embodiments, the chemical treatment stage 44 may further comprise a chemical agent 48. As shown in FIG. 5, when the chemical treatment vessel is present 44, the chemical agent 48 is disposed within the chemical treatment vessel 44. The chemical agent 48 contacts any pharmaceutical drugs of the residual pharmaceutical composition to deactivate, denature, oxidize, or otherwise change the pharmaceutical drugs such that the pharmaceutical drugs are unrecoverable.

The chemical agent 48 may comprise any compounds suitable to render the pharmaceutical drugs of the residual pharmaceutical composition unrecoverable. In some embodiments, the chemical agent 48 comprises a bittering agent, an emetic, a denaturant, an ionization agent, an oxidizing agent, a catalyzing agent, an anti-fungal agent, a viscosity modifier, a binding agent, and combinations thereof. In one embodiment, the chemical agent comprises a deactivator, a denaturant, and oxidizer, and combinations thereof. Of course, still other compounds are contemplated.

The bittering agent may be any bittering agent suitable to render the residual pharmaceutical composition unpalatable in taste such that any pharmaceutical drugs of the residual pharmaceutical composition are rendered unrecoverable. In one embodiment, the bittering agent may be denatonium benzoate (trade name Bitrex®). Of course, still other bittering agents are contemplated.

The emetic may be any emetic suitable to induce vomiting and/or cause sickness such that any pharmaceutical drugs of the residual pharmaceutical composition are rendered unrecoverable. In one embodiment, the emetic may be ipecac. Of course, still other emetics are contemplated.

The denaturant may be any denaturant suitable to increase the difficulty associated with recovery of any pharmaceutical drugs of the residual pharmaceutical. In some embodiments, the denaturant may be quinine sulfate dehydrate, brucine (or brucine sulfate), nicotine, cinchonidine (or cinchonidine sulfate), 2-hydroxymethyl ether, 2-(hydroxymethyl) amino ethanol, ammonium hydroxide, sodium hydroxide, denatonium benzoate, quassin, naringin, sodium chloride, sodium carbonate, ferrous sulfate, edifas B, sodium carboxymethyl cellulose, carboxymethyl ether, chlorine dioxide, chlorine, bromine, sodium bicarbonate, formamide (deionized), guanidine thiocyanate, guanidine isothiocyanate, sodium dodecyl sulfate (SDS), formamide, guanidine hydrochloride, guanidine isothiocyanate solution, urea, thiourea, guanidinium chloride, dihydrofolate reductase, calcium sulfate dihydrate, Cole-Parmer quinine, Cole-Parmer 2-ketoglutaric acid, Cole-Parmer tetramethyltin, 2-ketoglutaric acid, cerium sulfate, quercetin dihydrate, oxalic acid dihydrate, lithium sulfate, (+)-(R)-trans-4-(1-Aminoethyl)-N-(4-pyridyl)cyclohexanecarboxamide dihydrochloride; (+/−)-1-(5-Isoquinolinesulfonyl)-2-methyl piperazine dihydrochloride; (+/−)-3-Aminopyrrolidine dihydrochloride; (+/−)-trans-4-(2-Pyridinyl)-pyrrolidine-3-carboxylic acid dihydrochloride; (+/−)-trans-4-(4-Pyridinyl)-pyrrolidine-3-carboxylic acid dihydrochloride; (−)-N-(1(R)-Phenylethyl)-1-azabicyclo[2.2.2]octan-3(S)-amine dihydrochloride; (1,4-Dimethylpiperazin-2-yl)acetic aciddihydrochloride; (1-(5-Isoquinolinesulfonyl)-homopiperazine dihydrochloride; (1-Aza-bicyclo[2.2.2]oct-3-yl)-(4-fluoro-benzyl)-amine dihydrochloride; (1-Aza-bicyclo[2.2.2]oct-3-yl)-(4-methoxy-benzyl)-amine dihydrochloride; (1-Methyl-1H-benzimidazol-2-yl)methyl amine dihydrochloride;

(1-Methyl-piperidin-4-yl)-pyridin-3-ylmethylamine-dihydrochloride; (1-[1,3]Oxazolo[4,5-b]pyridin-2-ylpyrrolidin-3-yl)methylamine dihydrochloride: (1H-Imidazol-2-yl) methanamine dihydrochloride; (1R,2R)-trans-1,2-Cyclopentanediamine dihydrochloride; (1S,2S)-1,2-bis(2,4, 6-trimethylphenyl)ethylenediamine dihydrochloride hydrate; (1S,2S)-1,2-bis(2-Chlorophenyl)ethylenediamine dihydrochloride; (1S,2S)-1,2-bis(4-Fluorophenyl)ethylenediamine dihydrochloride: (1S,2S)-1,2-Bis(4-methoxyphenyl)ethylenediamine dihydrochloride; (1S,2S)-1,2-bis(4-Nitrophenyl)ethylenediamine dihydrochloride; (1S,2S)-1,2-di-1-naphthylethylenediamine dihydrochloride; (1S,2S)-trans-1,2-Cyclopentanediamine dihydrochloride; (1 S,4S)-5-Methyl-2,5-diazabicyclo[2.2.1]heptane dihydrochloride; (2,4-Dimethyl-1,3-thiazol-5-yl)methylaminedihydrochloride; (2-Amino-benzothiazol-8-yl)-acetic acid dihydrochloride; (2-Chloro-6-fluorobenzyl)hydrazine dihydrochloride; (2-Dimethyl aminoethyl)-reserpilinate dihydrochloride; (2-Ethyl-1,4-diazepan-1-yl)methanoldihydrochloride; (2-Imidazol-1-ylethyl)methylamine dihydrochloride; and (2-Imino-thiazol-3-yl)acetic acid dihydrochloride, and combinations thereof. In one embodiment, the denaturant is quinine sulfate dehydrate. Of course, still other denaturants are contemplated.

The oxidizing agent may be any oxidizing agent suitable for oxidizing any pharmaceutical drugs of the residual pharmaceutical composition such that the pharmaceutical drugs of the residual pharmaceutical composition are unrecoverable. The oxidizing agent may be a chlorine-based oxidizing agent, a non-chlorine-based oxidizing agent, and combinations thereof By way of non-limiting example, the chlorine-based oxidizing agent may be sodium hypochlorite, magnesium hypochlorite, calcium hypochlorite, or any other stable solid chlorine compounds and salts thereof. By way of non-limiting example, the non-chlorine-based oxidizing agent may be bromine-based oxidizing agents, stabilized peroxide compounds such as persulfate, permonosulfate, permanganate, and other stabilized peroxide compounds and salts thereof, and metal oxides. Of course, still other oxidizing agents are contemplated.

In one embodiment, the chemical agent comprises a chlorine-based oxidizing agent.

Figure 6:
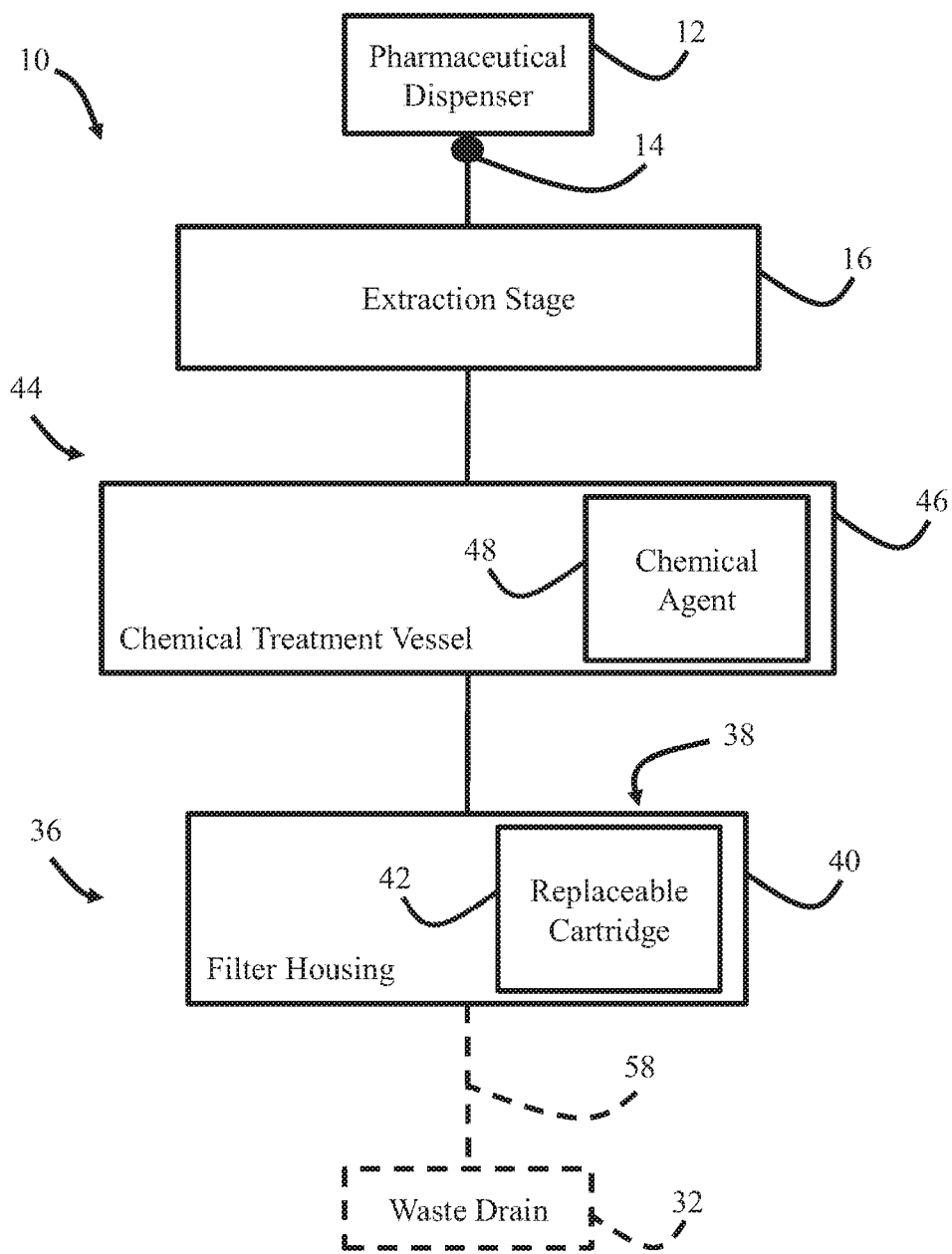
FIG. 6 is a schematic illustration of another embodiment of a pharmaceutical waste system including a separation stage and a chemical treatment stage.

With reference to FIG. 6, in one embodiment, the pharmaceutical waste treatment stage comprises the chemical treatment stage 44 in fluid communication with the extraction stage 16. The chemical treatment stage 44 comprises the chemical treatment vessel 46, and the chemical agent 48. The pharmaceutical waste treatment stage 18 further comprises the separation stage 36. The separation stage 36 is in fluid communication with the chemical treatment stage 44. The separation stage 36 comprises the filter assembly 38. The filter assembly 38 comprises the filter housing 40, and the filter media disposed within the filter housing 40. In the illustrated embodiment, the separation stage 36 is downstream of the chemical treatment stage 44. However, it is contemplated that the separation stage may be upstream of the chemical treatment stage. It is further contemplated that the separation stage may be arranged in parallel with the chemical treatment stage, and that a portion of the residual pharmaceutical composition will be directed to the chemical treatment stage and another portion of the residual pharmaceutical composition will be directed to the separation stage. In other words, it is contemplated that the residual pharmaceutical composition may not pass through the chemical treatment stage and the separation stage even if the chemical treatment stage and the separation stage are both present.

In some embodiments, that pharmaceutical waste treatment stage may further comprise a light source configured to deactivate and/or denature any pharmaceutical drugs of the residual pharmaceutical composition. The light source may be visible light, ultraviolet light, or any other light source suitable to deactivate and/or denature any pharmaceutical drugs of the residual pharmaceutical composition such that the pharmaceutical drugs are rendered unrecoverable.

With reference again to FIGS. 2A and 2B, the pharmaceutical waste system 10 may further comprise a main housing 50. When the main housing 50 is present, at least a portion of the extraction stage and the pharmaceutical waste treatment stage are disposed within the main housing 50, i.e., the extraction stage and the pharmaceutical waste treatment stage are at least partially disposed with said main housing 50. In the illustrated embodiment, the main housing 50 has a rectangular configuration. Moreover, in the illustrated embodiment, the main housing 50 comprises an access member, such as door 51 and a handle 53 for opening the door 51. However, it should be appreciated that the design of the main housing 50 is not particularly limited, and that the main housing 50 may assume any suitable configuration.

With reference to FIG. 2A, when the main housing 50 is present, the pharmaceutical waste system 10 may further comprise a security mechanism 52. The security mechanism 52 is configured to prevent unauthorized access to the main housing 50, which necessarily prevents unauthorized access the contents of the main housing 50, such as the manifold 24, the pump 30, the reservoir 34, and/or the filter assembly 38 (i.e., the extraction and pharmaceutical waste treatment stages). In certain embodiments, the manifold 24, pump 20, the reservoir 34 and/or the filter assembly 38 may be fully within the main housing 50. It should be appreciated that the design of the security mechanism 52 is not particularly limited, and that the security mechanism 52 may assume any suitable configuration. By way of non-limiting example, the security mechanism 52 may comprise a combination lock or a lock requiring one or more of a key, passcode, fingerprint reader, voice recognition, or any other suitable type of lock. The security mechanism 52 may be movable between a locked configuration and an unlocked configuration. In the locked configuration, the security mechanism 52 locks the main housing 50 such that unauthorized access to the extraction stage and the waste treatment stage is prevented. In the unlocked configuration, the security mechanism 52 unlocks the main housing 50 such that authorized access to the extraction stage and waste treatment stage is permitted.

In some embodiments, when the chemical treatment vessel and chemical treatment agent are present, chemical treatment vessel may be disposed at least partially within, or fully within, the main housing. In other embodiments, the chemical treatment vessel may be disposed within the main housing. Of course, it is contemplated that the chemical treatment vessel may be located outside of the main housing.

In some embodiments, when the light source is present, the light source may be disposed at least partially within the main housing. In other embodiments, the light source may be disposed fully within the main housing. Of course, it is contemplated that the chemical treatment vessel may be located outside of the main housing A shown in FIG. 2A, in one embodiment, the security mechanism 52 comprises a keypad 54 and an RFID sensor 56. In the illustrated embodiment, the patient care provider may input a passcode on the keypad 54 or, alternatively, place an RFID chip in proximity of the RFID sensor 56 to move the security mechanism 52 from the locked configuration to the unlocked configuration. In this manner, the security mechanism 52 advantageously allows the patient care provider or other person to perform maintenance on the pharmaceutical waste assembly 10, such as replacing the replaceable filter cartridge of the filter assembly 38, while simultaneously mitigating the risk of drug diversion within the healthcare facility by preventing unauthorized access to the residual pharmaceutical composition which is contained in the extraction stage, the pharmaceutical waste treatment stage, and or the fluid conduits therebetween. Likewise, the security mechanism allows for the patient care provider or other person to perform maintenance on the fluid conduits, the manifold, the reservoir, the filter assembly, the chemical treatment vessel, and/or any other component and/or stage described herein that may be disposed within the main housing, while simultaneously mitigating the risk of drug diversion.

With reference again to FIG. 1, in some embodiments, the pharmaceutical waste system 10 may further comprise a drain conduit 58 coupled to the pharmaceutical waste treatment stage 18. The drain conduit 58 may be configured to couple to the waste drain 32 for disposal of the treated pharmaceutical composition (i.e., the residual pharmaceutical composition after the pharmaceutical waste treatment stage). Alternatively, in one embodiment, the drain conduit may be coupled to a waste container, or any other container suitable for disposing of the treated pharmaceutical composition. In still other embodiments, the drain conduit may be coupled to both the waste drain and the waste container. In this manner, treatment of the residual pharmaceutical composition is streamlined such that the patient care provider can couple the pharmaceutical dispenser 12 to the pharmaceutical dispenser coupler 14 and the pharmaceutical waste system 10 will extract the residual pharmaceutical composition form the pharmaceutical dispenser 12, change the residual pharmaceutical composition in one of a chemical and physical manner, and then dispose of the treated pharmaceutical composition. It should be appreciated that the design of the drain conduit 58 is not particularly limited, and that the drain conduit 58 may assume any suitable configuration.

In one embodiment, when the drain conduit is coupled to a waste container, the waste container may be configured to receive the treated pharmaceutical composition. The waste container may comprise the chemical agent as described herein to further ensure that any pharmaceutical drugs of the residual pharmaceutical composition are rendered unrecoverable. It should be appreciated that the design of the waste container is not particularly limited, and that the waste container may assume any suitable configuration. It is contemplated that, once the waste container is filled with treated pharmaceutical composition, the waste container can be readily disposed of, and replaced, by the patient care provider.

With reference to FIG. 4, when the separation stage 36 comprises the filter assembly 38, it is contemplated that the purified waste portion is disposed of in the waste drain 32 through the drain conduit 58, and that the contaminated waste portion remains bound to the filter media.

In some embodiments, the pharmaceutical waste system may further comprise a controller configured to control the pharmaceutical waste system. The controller may include one or more processors, or microprocessors, for processing instructions stored in memory to control operation of the pharmaceutical waste system. Such instructions may be any of the functions, algorithms or techniques described herein performed by the controller. Additionally or alternatively, the controller may comprise one or more microcontrollers, field programmable gate arrays, systems on a chip, discrete circuitry, and/or other suitable hardware, software, or firmware that is capable of carrying out the functions described herein. The controller may be disposed within the main housing of the pharmaceutical waste system. Alternatively, the controller may be located remote from the pharmaceutical waste system, and communicate with the pharmaceutical waste system through a wired or wireless connection. In one embodiment, the controller is disposed within the main housing of the pharmaceutical waste system. The controller may comprise one or more subcontrollers configured to control the pharmaceutical waste system and/or components of the extraction stage and the pharmaceutical waste treatment stage, collectively. Alternatively, the controller may comprise one or more subcontrollers for the extraction stage and the pharmaceutical waste treatment stage individually, and for certain components of the extraction stage and the pharmaceutical waste treatment stage such as, for example, the pump.

In some embodiments, the controller may be configured to receive data from the extraction stage and the pharmaceutical waste treatment stage. The data received from the extraction stage and the pharmaceutical waste treatment stage may include operating parameters of the extraction stage and the pharmaceutical waste treatment stage. As but one example, the controller may receive data from the reservoir indicative of a volume of the residual pharmaceutical composition within the reservoir. In this manner, the controller may advantageously control the pump to extract more residual pharmaceutical composition from the pharmaceutical dispenser and/or deliver more residual pharmaceutical composition to the pharmaceutical waste treatment stage based on the volume of the residual pharmaceutical waste composition within the reservoir. As another example, the controller may receive data indicative that one or more components of the extraction stage and pharmaceutical waste treatment stage require maintenance. In response to data indicative that one or more components of the extraction stage and pharmaceutical waste treatment stage require maintenance, the controller may output a signal to alert the patient care provider. The alert may be audible and/or visual.

In some embodiments, the controller may be configured to receive data from the security mechanism of the main housing. The data may include whether the security mechanism is in the locked configuration or the unlocked configuration. The controller may further be configured to determine whether the extraction stage and the pharmaceutical waste treatment stage are accessible (i.e., if the main housing is open or closed). In this manner, the controller may determine if unauthorized access to the extraction stage and the pharmaceutical waste treatment stage has occurred. For example, the controller may determine that unauthorized access to the extraction stage and the pharmaceutical waste treatment stage has occurred when the security mechanism is in the locked configuration and the main housing is open. In response to unauthorized access, the controller may output a signal to alert the patient care provider that unauthorized access has occurred. The alert may be audible and/or visual.

With reference to again to FIG. 1, in some embodiments, the pharmaceutical waste system 10 may further comprise a waste analysis stage 60. When present, the waste analysis stage 60 may be in fluid communication with one of the extraction stage 16 and the pharmaceutical waste treatment stage 18, or both the extraction stage 16 and the pharmaceutical waste treatment stage 18. In one embodiment, the waste analysis stage may be in fluid communication with the extraction stage at a location upstream of the extraction stage. In another embodiment, the waste analysis stage may be in fluid communication with the extraction stage at a location downstream of the extraction stage and upstream of the pharmaceutical waste treatment stage. In still other embodiments, the waste analysis stage is in fluid communication with the pharmaceutical waste treatment stage at a location downstream of the pharmaceutical waste treatment stage. In some embodiments, the waste analysis stage is in fluid communication with both the extraction stage and the pharmaceutical waste treatment stage at a location upstream of the extraction stage, downstream of the extraction stage and upstream of the pharmaceutical waste treatment stage, downstream of the pharmaceutical waste treatment stage, and combinations thereof.

When present, the waste analysis stage 60 is configured to analyze an output or an input of one of the extraction stage 16 and the pharmaceutical waste treatment stage 18. The waste analysis stage 60 may comprise any analytical equipment suitable to analyze the output or input of the extraction stage 16 and/or the pharmaceutical waste treatment stage 18. By way of non-limiting example, the waste analysis stage 60 may comprise refractometers, liquid or gas mass spectrometers, infrared (IR) spectrometers, nuclear magnetic resonance (NMR) spectrometers, ultraviolet-visible (UV-Vis) spectrophotometers, and combinations thereof. In one embodiment, the waste analysis stage comprises a refractometer to measure a refractive index and a concentration of the residual pharmaceutical composition. Of course, it is contemplated that the waste analysis stage may comprise still other analytical equipment.

In some embodiments, the waste analysis stage may be disposed at least partially within the main housing. In other embodiments, the waste analysis stage may be disposed fully within the main housing. Of course, it is contemplated that the waste analysis stage may be located outside of the main housing.

In some embodiments, the controller is configured to receive data from the waste analysis stage to determine a characteristic of the output or input of the extraction stage and/or the pharmaceutical waste treatment stage. By way of non-limiting example, the characteristic of the input or output of the extraction stage and/or the pharmaceutical waste treatment stage determined by the controller may be the identity of any pharmaceutical drugs of the residual pharmaceutical composition, the concentration of any pharmaceutical drugs of the residual pharmaceutical composition, and combinations thereof. As but one example, the waste controller may determine the concentration of any pharmaceutical drugs at the output of the pharmaceutical waste treatment stage. In this manner, the controller may verify that pharmaceutical waste treatment stage has changed the residual pharmaceutical composition in one of a physical and chemical manner such that any pharmaceutical drugs of the residual pharmaceutical composition have been rendered unrecoverable. Of course, it is contemplated that the controller may determine still other characteristics of the output or input of the extraction stage and/or the pharmaceutical waste treatment stage.

In some embodiments, if the controller determines that the residual pharmaceutical composition is changed in one of a physical and chemical manner based on the output of the waste analysis stage, the controller may control the pump to deliver more residual pharmaceutical composition from the extraction stage to the pharmaceutical waste treatment stage, such as delivering more residual pharmaceutical composition from the reservoir to the pharmaceutical waste treatment stage. Alternatively, if the controller determines that the residual pharmaceutical composition is not changed in one of a physical and chemical manner, the controller may control the pump to prevent delivery of more residual pharmaceutical composition from the extraction stage to the pharmaceutical waste treatment stage. Moreover, in response to determining that the residual pharmaceutical composition is not changed in one of a physical and chemical manner, the controller may output a signal to alert the patient caregiver that any pharmaceutical drugs of the residual pharmaceutical composition have not been rendered unrecoverable. The alert may be audible and/or visual.

In some embodiments, the pharmaceutical waste system may further comprise a cleaning stage (not shown) in fluid communication with the extraction stage and the pharmaceutical waste treatment stage. The cleaning stage is configured to clean components of the extraction stage and the pharmaceutical waste treatment stage after the residual pharmaceutical composition has been disposed of. It should be appreciated that the design of the cleaning stage is not particularly limited, and that the cleaning stage may assume any suitable configuration. By way of non-limiting example, the cleaning stage may comprise a back-flush feature configured to remove any remaining pharmaceutical drugs of the pharmaceutical waste system (or other waste) remaining after disposal of the residual pharmaceutical composition. In this manner, the cleaning stage advantageously allows the pharmaceutical waste system to purge itself of remaining pharmaceutical drugs. The cleaning stage may further comprise a cleaning agent (e.g., a denaturant, an oxidizing agent, etc.) that is injected during the cleaning to remove any remaining pharmaceutical drugs.

In some embodiments, the cleaning stage may be disposed at least partially within the main housing. In other embodiments, the cleaning stage may be disposed fully within the main housing. Of course, it is contemplated that the cleaning stage may be located outside of the main housing.

With reference again to FIGS. 2A and 2B, in some embodiments, the pharmaceutical waste system 10 may further comprise a user input device 62. The user input device 62 is configured to allow the patient care provider to operate the pharmaceutical waste system 10. By way of non-limiting example, the user input device 62 may comprise a touchscreen display screen, a button, a voice actuation device, a motion sensor, and combinations thereof. When the user input device 62 is a touchscreen display screen, the touchscreen display screen may be operable to display data pertaining to the pharmaceutical waste system 10 and a plurality of icons that are selectable using capacitive touch to control the pharmaceutical waste system 10. The data may correspond to data communicated to the touchscreen display screen from the controller.

In some embodiments, the user input device may take the form of buttons provided on the main housing around the display screen. The buttons may control dedicated functions of the pharmaceutical waste systems. In some embodiments, the functions associated with the buttons may change in response to changes to the information shown on the display screen. In such embodiments, indicia regarding active functions currently associated with the buttons may be shown on the display screen near the buttons.

By way of non-limiting example, the user input device may be configured to allow the patient care provider to input their name and/or ID, enter a description of any pharmaceutical drugs of the residual pharmaceutical composition, fluidly couple pharmaceutical dispensers to the extraction stage, operate the pump to pump the residual pharmaceutical composition to the various stages of the pharmaceutical waste system, operate the pump and/or extraction device to extract the residual pharmaceutical composition disposed within the pharmaceutical dispensers, stop the pump from pumping the residual pharmaceutical composition to the various stages of the pharmaceutical waste system, operate the cleaning stage to clean the pharmaceutical waste system, etc.

With reference again to FIGS. 2A and 2B, in the illustrated embodiment, some of the fluid conduits (i.e., the drain conduit 58, and the fluid conduits fluidly coupling the first and second pharmaceutical dispensers 12, 22 to the manifold 24) comprise a flow restricting device 64, such as the check valve 64. The flow restricting device 64 may be configured to permit flow of the residual pharmaceutical composition in only one direction. For example, in the illustrated embodiment (FIG. 2A), the check valve 64 of the drain conduit 58 may only permit flow of the residual pharmaceutical composition in a direction away from the filter assembly 38. Likewise, the check valve 64 of the fluid conduits fluidly coupling the first and second pharmaceutical dispensers 12, 22 to the manifold 24 may only permit flow of the residual pharmaceutical composition in a direction away from the first and second pharmaceutical dispensers 12, 22. In this manner, the check valves 36 cooperate with the security mechanism 52 of the main housing 50 to advantageously mitigate the risk of drug diversion in the healthcare facility by limiting access to the residual pharmaceutical composition after extraction and before treatment. Of course, although the illustrated embodiment shows only some of the fluid conduits comprising the flow restricting device, it is contemplated that any of the fluid conduits may comprise the flow restricting device.

In some embodiments, the flow restricting device may be configured to be in communication with the controller. When the flow restricting device is in communication with the controller, the flow restricting device may be configured to permit flow of the treated pharmaceutical composition to one of the waste drain and the waste container based on the determined characteristics of the treated pharmaceutical composition. For example, if the controller determines that the concentration of any pharmaceutical drugs of the treated pharmaceutical composition are below a threshold value, the controller may control the flow restricting device to permit flow of the treated pharmaceutical composition to the waste drain. Moreover, if the controller determines that the concentration of any pharmaceutical drugs of the treated pharmaceutical composition are equal to or above the threshold value, the controller may control the flow restricting device to permit flow of the treated pharmaceutical composition to the waste container. In one embodiment, the controller may control the flow restricting device to permit flow to both the waste drain and the waste container based on the determined characteristics of the treated pharmaceutical composition. In still other embodiments, the controller may control the flow restricting device to prevent flow of the treated pharmaceutical composition to both of the waste drain and the waste contain based on the determined characteristics of the treated pharmaceutical composition.

In some embodiments, when the flow restricting device is in communication with the controller, the flow restricting device may be configured to regulate the flow of the residual pharmaceutical composition through the flow restricting device. For example, the flow restricting device may be a gate valve, butterfly valve, a rotary valve, or any other valve suitable for regulating the flow of the residual pharmaceutical composition through the valve. In one embodiment, when the flow restricting device is disposed in the fluid conduit fluidly coupling the pharmaceutical dispenser to the manifold, the controller may operate the flow restricting device to close (i.e., prevent flow through the flow restricting device) after the residual pharmaceutical composition has been extracted from the pharmaceutical dispenser. Moreover, the controller may operate the flow restricting device to open (i.e., allow flow through the flow restricting device) when the pharmaceutical dispenser is coupled to the pharmaceutical dispenser coupler. In this manner, the flow restricting device may cooperate with the security mechanism of the main housing to advantageously mitigate the risk of drug diversion in the healthcare facility by limiting access to the residual pharmaceutical composition after extraction and before treatment.

The present disclosure also provides a method of disposing of the residual pharmaceutical composition from the pharmaceutical dispenser.

Figure 7:
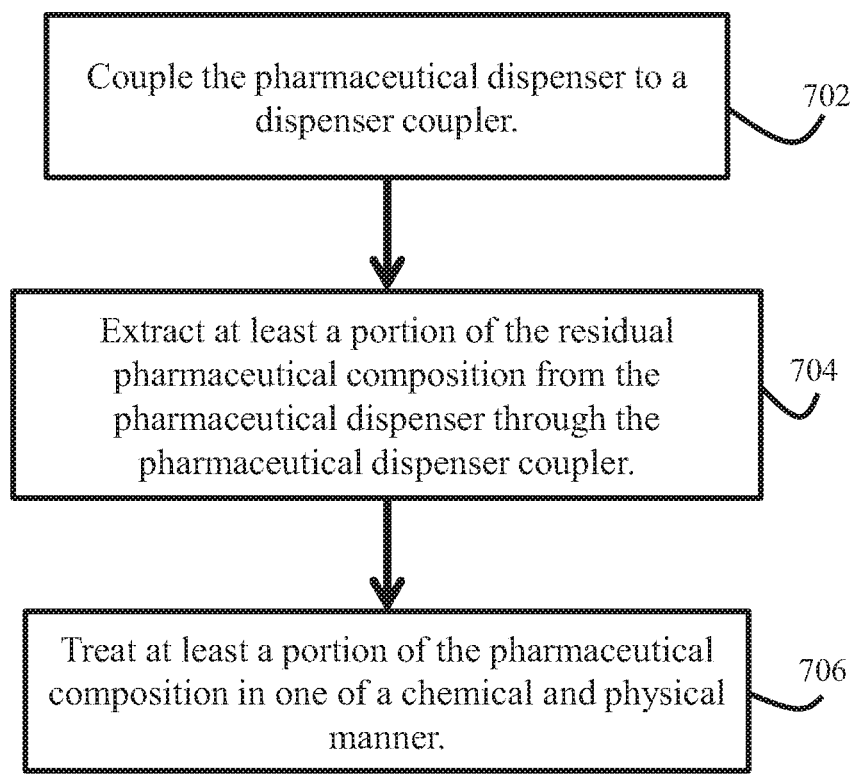
FIG. 7 is a flowchart of a method of disposing of residual pharmaceutical compositions according to one embodiment.

With reference to the flowchart of FIG. 7, the method comprises a step 702 of coupling the pharmaceutical dispenser to the pharmaceutical dispenser coupler. The pharmaceutical dispenser may be any pharmaceutical dispenser described herein. The pharmaceutical dispenser coupler may be any pharmaceutical dispenser coupler described herein. The pharmaceutical dispenser may be coupled to the to a pharmaceutical dispenser coupler such that the pharmaceutical dispenser is in fluid communication with the extraction stage of the pharmaceutical waste system described herein.

With continued reference to FIG. 7, the method further comprises a step 704 of extracting, such as pumping, at least a portion of the residual pharmaceutical composition from the pharmaceutical dispenser through the pharmaceutical dispenser coupler. The portion of the residual pharmaceutical composition extracted in step 704 may be referred to as the extracted pharmaceutical composition. The portion of the residual pharmaceutical composition may be extracted in any suitable manner.

With reference again to FIG. 7, the method further comprises a step 706 of treating at least a portion of the extracted pharmaceutical composition in one of a chemical and physical manner. The portion of the extracted pharmaceutical composition treated in step 706 may be referred to as the treated pharmaceutical composition.

In some embodiments, the step of treating may further comprise separating the extracted pharmaceutical composition into the purified waste portion and the contaminated waste portion. The extracted pharmaceutical composition may be separated in any suitable manner. For example, the extracted pharmaceutical composition may be separated by filtering at least a portion of the extracted pharmaceutical composition into the purified waste portion and the contaminated waste portion. The portion of the extracted pharmaceutical composition may be, for example, filtered by the filter assembly described herein.

In some embodiments, the step of treating may further comprise chemically treating the extracted pharmaceutical composition. The extracted pharmaceutical composition may be chemically treated in any suitable manner. For example, the extracted pharmaceutical composition may be chemically treated by deactivating the extracted pharmaceutical composition, denaturing the extracted pharmaceutical composition, oxidizing the extracted pharmaceutical composition, and combinations thereof. In one embodiment, the extracted pharmaceutical composition may be oxidized with the chlorine-based oxidizing agent described herein.

In some embodiments, the step of treating may comprise oxidizing the extracted pharmaceutical composition to form an unrecoverable pharmaceutical waste, and separating the unrecoverable pharmaceutical waste between the purified waste portion and the contaminated waste portion.

In some embodiments, the method may further comprise a step of analyzing at least a portion of the extracted pharmaceutical composition to determine a characteristic of the extracted pharmaceutical composition. The extracted pharmaceutical composition may be analyzed in any suitable manner. For example, the extracted pharmaceutical composition may be analyzed by any analytical equipment described herein. By way of non-limiting example, the characteristic of the extracted pharmaceutical composition that is determined may be the identity of any pharmaceutical drugs of the extracted pharmaceutical composition, the concentration of any pharmaceutical drugs of the extracted pharmaceutical composition, and combinations thereof.

In some embodiments, the method may further comprise a step of storing at least a portion of the extracted pharmaceutical composition in the reservoir before treating the at least a portion of the extracted pharmaceutical composition. For example, the extracted pharmaceutical composition may be temporarily stored in the reservoir to allow the pharmaceutical waste treatment stage enough time to treat another portion of the extracted pharmaceutical composition. The extracted pharmaceutical composition may be stored in any reservoir described herein.

In some embodiments, the method may further comprise a step of pumping the treated pharmaceutical composition form the pharmaceutical waste treatment stage to the waste drain and/or the waste container. In one embodiment, when the extracted pharmaceutical composition is separated between the purified waste portion and the contaminated waste portion, the purified waste portion may be pumped to the waste drain and/or waste container. The waste container may be any waste container described herein.

It will be further appreciated that the terms "include," "includes," and "including" have the same meaning as the terms "comprise," "comprises," and "comprising."

The present invention has been described in an illustrative manner. It is to be understood that the terminology, which has been used, is intended to be in the nature of words of description rather than of limitation. Many modifications and variations of the present invention are possible in light of the above teachings. Therefore, the present invention may be practiced other than as specifically described.

Embodiments of the disclosure may be described with reference to the following exemplary clauses:

Clause 1—A waste system for collecting and disposing of waste products, the waste system comprising: a waste dispenser that contains a volume of waste product; and a manifold that is configured to substantially simultaneously receive the volume of waste product from the waste dispenser.

Clause 2—A waste system as set forth in clause 1 further comprising a pump assembly that is coupled to the manifold, the pump assembly being configured to selectively remove the waste product from the manifold.

Clause 3—A waste system as set forth in clause 2 wherein the pump assembly includes one of a rotary-type positive displacement pump, a reciprocating-type positive displacement pump, a linear-type positive displacement pump, an impulse pump, a velocity pump, a radial-flow pump, an axial-flow pump, or a gravity pump.

Clause 4—A waste system as set forth in clause 2 further comprising a disposal receptacle, wherein the pump assembly transfers the waste product to the disposal receptacle for disposal.

Clause 5—A waste system as set forth in clause 4 further comprising a waste adjustment assembly, wherein the pump assembly pumps the waste product through the waste adjustment assembly that is configured to change the waste product in one of a chemical and physical manner prior to the waste product being transferred to the disposal receptacle.

Clause 6—A waste system as set forth in clause 4 further comprising a filter assembly, wherein the pump assembly pumps the waste product through the filter assembly that is configured to remove any undesired components from the waste product prior to the waste product being transferred to the disposal receptacle.

Clause 7—A waste system as set forth in clause 4 further comprising a cleaning system that is configured to clean the waste system after the waste product has been transferred to the disposal receptacle.

Clause 8—A waste system as set forth in clause 1 further comprising a waste analysis system that is configured to analyze the waste product contained in the waste dispenser to confirm the authenticity of the waste product.

Clause 9—A waste system as set forth in clause 1 further comprising an operational control system that is configured to enable an operator to control the operation of the waste system.

Clause 10—A waste system for collecting and disposing of waste product that is contained within a waste dispenser, the waste system comprising: a pump assembly that is coupled to the waste dispenser, the pump assembly being configured to selectively remove the waste product from the waste dispenser.

Clause 11—A waste system as set forth in clause 10 wherein the pump assembly includes one of a rotary-type positive displacement pump, a reciprocating-type positive displacement pump, a linear-type positive displacement pump, an impulse pump, a velocity pump, a radial-flow pump, an axial-flow pump, or a gravity pump.

Clause 12—A waste system as set forth in clause 10 further comprising a disposal receptacle, wherein the pump assembly transfers the waste product to the disposal receptacle for disposal.

Clause 13—A waste system as set forth in clause 12 further comprising a waste adjustment assembly, wherein the pump assembly pumps the waste product through the waste adjustment assembly that is configured to change the waste product in one of a chemical and physical manner prior to the waste product being transferred to the disposal receptacle.

Clause 14—A waste system as set forth in clause 12 further comprising a filter assembly, wherein the pump assembly pumps the waste product through the filter assembly that is configured to remove any undesired components from the waste product prior to the waste product being transferred to the disposal receptacle.

Clause 15—A waste system as set forth in clause 12 further comprising a cleaning system that is configured to clean the waste system after the waste product has been transferred to the disposal receptacle.

Clause 16—A waste system as set forth in clause 10 further comprising a waste analysis system that is configured to analyze the waste product contained within the waste dispenser to confirm the authenticity of the waste product.

Clause 17—A waste system as set forth in clause 10 further comprising an operational control system that is configured to enable an operator to control the operation of the waste system.

Clause 18—A waste system as set forth in clause 10 further comprising a waste removal assistance system that is configured to enhance the removal of the waste product from the waste dispenser.

Clause 19—A waste system for collecting and disposing of waste product that is contained within a waste dispenser, the waste system comprising: a waste adjustment assembly that receives the waste product; and a disposal receptacle that is configured to receive the waste product for disposal; wherein the filter assembly is configured to change the waste product in one of a chemical and physical manner prior to the waste product being transferred to the disposal receptacle.

Clause 20—A waste system as set forth in clause 19 wherein the waste adjustment assembly includes at least one of a deactivator, a denaturant and an oxidizer.

Clause 21—A waste system as set forth in clause 19 further comprising a pump assembly that is coupled to the waste dispenser, the pump assembly selectively moving the waste product from the waste dispenser to the waste adjustment assembly.

Clause 22—A waste system as set forth in clause 19 further comprising a cleaning system that is configured to clean the waste system after the waste product has been transferred to the disposal receptacle.

Clause 23—A waste system as set forth in clause 19 further comprising a waste analysis system that is configured to analyze the waste product contained within the waste dispenser to confirm the authenticity of the waste product.

Clause 24—A waste system as set forth in clause 19 further comprising an operational control system that is configured to enable an operator to control the operation of the waste system.

Clause 25—A waste system for collecting and disposing of waste product that is contained within at least one waste dispenser, the waste system comprising: a filter assembly that receives the waste product; and a disposal receptacle that is configured to receive the waste product for disposal; and wherein the filter assembly is configured to remove any undesired components from the waste product prior to the waste product being transferred to the disposal receptacle.

Clause 26—A waste system as set forth in clause 25 wherein the filter assembly includes at least one cartridge that is configured to remove undesired components from the waste product.

Clause 27—A waste system as set forth in clause 25 further comprising a pump assembly that is coupled to the at least one waste dispenser, the pump assembly selectively moving the waste product from the at least one waste dispenser to the filter assembly.

Clause 28—A waste system as set forth in clause 25 further comprising a cleaning system that is configured to clean the waste system after the waste product has been transferred to the disposal receptacle.

Clause 29—A waste system as set forth in clause 25 further comprising a waste analysis system that is configured to analyze the waste product contained within the at least one waste dispenser to confirm the authenticity of the waste product.

Clause 30—A waste system as set forth in clause 25 further comprising an operational control system that is configured to enable an operator to control the operation of the waste system.

Clause 31—A waste system for collecting and disposing of fluid pharmaceutical waste that is contained within a fluid pharmaceutical dispenser, the waste system comprising: a pump assembly that is coupled to the fluid pharmaceutical dispenser, the pump assembly being configured to selectively remove the fluid pharmaceutical waste from the fluid pharmaceutical dispenser.

Clause 32—A waste system as set forth in clause 31 wherein the pump assembly includes one of a rotary-type positive displacement pump, a reciprocating-type positive displacement pump, a linear-type positive displacement pump, an impulse pump, a velocity pump, a radial-flow pump, an axial-flow pump, or a gravity pump.

Clause 33—A waste system as set forth in clause 31 further comprising a first fluid line, wherein the fluid pharmaceutical waste flows through the first fluid line between the fluid pharmaceutical dispenser and the pump assembly.

Clause 34—A waste system as set forth in clause 33 further comprising a storage container, wherein the pump assembly transfers the fluid pharmaceutical waste to the storage container for disposal.

Clause 35—A waste system as set forth in clause 34 further comprising a second fluid line, wherein the fluid pharmaceutical waste flows through the second fluid line between the pump assembly and the storage container.

Clause 36—A waste system as set forth in clause 31 further comprising a storage container, wherein the pump assembly transfers the fluid pharmaceutical waste to the storage container for disposal.

Clause 37—A waste system as set forth in clause 36 further comprising a first fluid line, wherein the fluid pharmaceutical waste flows through the first fluid line between the pump assembly and the storage container.

Clause 38—A waste system for collecting and disposing of fluid pharmaceutical waste, the waste system comprising: a fluid pharmaceutical dispenser that retains the fluid pharmaceutical waste; and a pump assembly that is coupled to the fluid pharmaceutical dispenser, the pump assembly being configured to selectively remove the fluid pharmaceutical waste from the fluid pharmaceutical dispenser.

Clause 39—A waste system as set forth in clause 38 wherein the fluid pharmaceutical dispenser includes an adaptor that selectively seals the fluid pharmaceutical dispenser to lock the fluid pharmaceutical waste therein.

Clause 40—A waste system as set forth in clause 38 wherein the pump assembly includes one of a rotary-type positive displacement pump, a reciprocating-type positive displacement pump, a linear-type positive displacement pump, an impulse pump, a velocity pump, a radial-flow pump, an axial-flow pump, or a gravity pump.

Clause 41—A waste system as set forth in clause 38 further comprising a first fluid line, wherein the fluid pharmaceutical waste flows through the first fluid line between the fluid pharmaceutical dispenser and the pump assembly.

Clause 42—A waste system as set forth in clause 41 further comprising a storage container, wherein the pump assembly transfers the fluid pharmaceutical waste to the storage container for disposal.

Clause 43—A waste system as set forth in clause 42 further comprising a second fluid line, wherein the fluid pharmaceutical waste flows through the second fluid line between the pump assembly and the storage container.

Clause 44—A waste system as set forth in clause 38 further comprising a storage container, wherein the pump assembly transfers the fluid pharmaceutical waste to the storage container for disposal.

Clause 45—A waste system as set forth in clause 44 further comprising a first fluid line, wherein the fluid pharmaceutical waste flows through the first fluid line between the pump assembly and the storage container.

Clause 46—A waste system for collecting and disposing of fluid pharmaceutical waste that is contained within a fluid pharmaceutical dispenser, the waste system comprising: a pump assembly that is coupled to the fluid pharmaceutical dispenser, the pump assembly being configured to selectively remove the fluid pharmaceutical waste from the fluid pharmaceutical dispenser; and a storage container that is coupled to the pump assembly, the storage container being configured to receive and retain the fluid pharmaceutical waste; and wherein the pump assembly is configured to transfer the fluid pharmaceutical waste to the storage container for disposal.

Clause 47—A waste system as set forth in clause 46 further comprising a first fluid line, wherein the fluid pharmaceutical waste flows through the first fluid line between the pump assembly and the storage container.

Clause 48—A waste system as set forth in clause 46 wherein the pump assembly includes one of a rotary-type positive displacement pump, a reciprocating-type positive displacement pump, a linear-type positive displacement pump, an impulse pump, a velocity pump, a radial-flow pump, an axial-flow pump, or a gravity pump.

Clause 49—A waste system as set forth in clause 46 further comprising a first fluid line, wherein the fluid pharmaceutical waste flows through the first fluid line between the fluid pharmaceutical dispenser and the pump assembly.

Clause 50—A waste system as set forth in clause 42 further comprising a second fluid line, wherein the fluid pharmaceutical waste flows through the second fluid line between the pump assembly and the storage container.

Clause 51—A waste system for collecting and disposing of fluid pharmaceutical waste, the waste system comprising: a fluid pharmaceutical dispenser that retains the fluid pharmaceutical waste; a pump assembly that is coupled to the fluid pharmaceutical dispenser, the pump assembly being configured to selectively remove the fluid pharmaceutical waste from the fluid pharmaceutical dispenser through a first fluid line; and a storage container that is coupled to the pump assembly, the storage container being configured to receive and retain the fluid pharmaceutical waste; and wherein the pump assembly is configured to transfer the fluid pharmaceutical waste to the storage container through a second fluid line for disposal.

Clause 52—A pharmaceutical waste system for treating a residual pharmaceutical composition disposed in a pharmaceutical dispenser, the pharmaceutical waste system comprising: an extraction stage in fluid communication with the pharmaceutical dispenser, with the extraction stage being configured to extract at least a portion of the residual pharmaceutical composition from the pharmaceutical dispenser; a pharmaceutical dispenser coupler configured to couple the pharmaceutical dispenser to the extraction stage; and a pharmaceutical waste treatment stage in fluid communication with the extraction stage, the pharmaceutical waste treatment stage being configured to change the residual pharmaceutical composition extracted from the pharmaceutical dispenser in one of a chemical and physical manner.

Clause 53—The pharmaceutical was system of clause 52 wherein the pharmaceutical waste treatment stage is further defined as a chemical treatment stage, the chemical treatment stage being configured to treat the residual pharmaceutical composition extracted from the pharmaceutical dispenser in a chemical manner.

Clause 54—The pharmaceutical waste system of clause 53 wherein the chemical treatment stage comprises a chemical treatment vessel in fluid communication with the extraction stage, and a chemical agent disposed within the chemical treatment vessel.

Clause 55—The pharmaceutical waste system of clause 54 wherein the chemical agent comprises a deactivator, a denaturant, an oxidizer, and combinations thereof.

Clause 56—The pharmaceutical waste system of clause 55 wherein the chemical agent comprises a chlorine-based oxidizing agent.

Clause 57—The pharmaceutical waste system of clause 52 wherein the pharmaceutical waste treatment stage comprises: a chemical treatment stage in fluid communication with the extraction stage, the chemical treatment stage being configured to treat the residual pharmaceutical composition extracted from the pharmaceutical dispenser in a chemical manner, with the chemical treatment stage comprising, a chemical treatment vessel in fluid communication with the separation stage, and a chemical agent disposed within the chemical treatment vessel; and a separation stage in fluid communication with the chemical treatment stage, with the separation stage being configured to separate the chemically-treated pharmaceutical waste from the chemical treatment stage into a purified waste portion and a contaminated waste portion, with the separation stage comprising, a filter assembly comprising a filter housing and a filter media disposed within the filter housing.

Clause 58—The pharmaceutical waste system of clause 52 further comprising a drain conduit coupled to the pharmaceutical waste treatment stage and adapted to be coupled to a waste drain for disposal of the treated pharmaceutical composition.

Clause 59—The pharmaceutical waste system of clause 52 further comprising a waste analysis stage in fluid communication one of the extraction stage and the pharmaceutical waste treatment stage, with the waste analysis stage being configured to analyze an output or an input of one of the extraction stage and the pharmaceutical waste treatment stage.

Clause 60—A method of disposing of a residual pharmaceutical composition from a pharmaceutical dispenser, the method comprising: coupling the pharmaceutical dispenser to a pharmaceutical dispenser coupler; extracting at least a portion of the residual pharmaceutical composition from the pharmaceutical dispenser through the pharmaceutical dispenser coupler; and treating at least a portion of the extracted pharmaceutical composition in one of a chemical and physical manner.

Clause 61—The method of clause 60 wherein treating at least a portion of the extracted pharmaceutical composition comprises separating the extracted pharmaceutical composition into a purified waste portion and a contaminated waste portion.

Clause 62—The method of claim 61 wherein separating the extracted pharmaceutical composition comprises filtering at least a portion of the extracted pharmaceutical composition.

Clause 63—The method of clause 60 wherein treating at least a portion of the extracted pharmaceutical composition comprises chemically treating the extracted pharmaceutical composition.

Clause 64—The method of clause 63 wherein chemically treating the extracted pharmaceutical composition comprises deactivating the extracted pharmaceutical composition, denaturing the extracted pharmaceutical composition, oxidizing the extracted pharmaceutical composition, and combinations thereof.

Clause 65—The method of clause 64 wherein chemically treating the extracted pharmaceutical composition comprises oxidizing the extracted pharmaceutical composition with a chlorine-based oxidizing agent.

Clause 66—The method of clause 60 further comprising analyzing at least a portion of the extracted pharmaceutical composition to determine a characteristic of the extracted pharmaceutical composition.

Clause 77—The method of clause 60 wherein treating at least a portion of the extracted pharmaceutical composition comprises oxidizing the extracted pharmaceutical composition to form an unrecoverable pharmaceutical waste, and separating the unrecoverable pharmaceutical waste between a purified waste portion and a contaminated waste portion.

Clause 78—The method of clause 60 further comprising temporarily storing at least a portion of the extracted pharmaceutical composition in a reservoir before treating the at least a portion of the extracted pharmaceutical composition.

What is claimed is:

1. A pharmaceutical waste system for treating a residual pharmaceutical composition disposed in an IV bag, the pharmaceutical waste system comprising:
    an extraction stage for being placed in fluid communication with the IV bag, with said extraction stage being configured to extract at least a portion of the residual pharmaceutical composition from the IV bag;
    a pharmaceutical dispenser coupler configured to couple the IV bag to said extraction stage;
    a pharmaceutical waste treatment stage in fluid communication with said extraction stage, said pharmaceutical waste treatment stage being configured to change the residual pharmaceutical composition extracted from the IV bag in one of a chemical and physical manner; and
    a main housing, with said extraction stage and said pharmaceutical waste treatment stage at least partially disposed within said main housing.

2. The pharmaceutical waste system of claim 1 wherein said pharmaceutical waste treatment stage is further defined as a separation stage, said separation stage being configured to separate the residual pharmaceutical composition extracted from the IV bag into a purified waste portion and a contaminated waste portion.

3. The pharmaceutical waste system of claim 2 wherein said separation stage comprises a filter assembly comprising a filter housing and a filter media disposed within said filter housing.

4. The pharmaceutical waste system of claim 3 wherein said filter media is configured to bind with at least a portion of the residual pharmaceutical composition extracted from the IV bag such that said filter media retains said contaminated waste portion.

5. The pharmaceutical waste system of claim 3 wherein said filter media comprises activated charcoal.

6. The pharmaceutical waste system of claim 3 wherein said filter assembly comprises a replaceable cartridge removably coupled to said filter housing, with said filter media disposed within said replaceable cartridge.

7. The pharmaceutical waste system as set forth in claim 1 wherein said pharmaceutical waste treatment stage is further defined as a chemical treatment stage, with said chemical treatment stage being configured to treat the residual pharmaceutical composition extracted from the IV bag in a chemical manner.

8. The pharmaceutical waste system of claim 7 wherein said chemical treatment stage comprises a chemical treatment vessel in fluid communication with said extraction stage, and a chemical agent disposed within said chemical treatment vessel.

9. The pharmaceutical waste system of claim 8 wherein said chemical agent comprises a deactivator, a denaturant, an oxidizer, and combinations thereof.

10. The pharmaceutical waste system as set forth in claim 1 wherein said extraction stage comprises a pump in fluid communication with said pharmaceutical dispenser coupler.

11. The pharmaceutical waste system of claim 10 wherein the pharmaceutical dispenser coupler is further defined as a first pharmaceutical dispenser coupler configured to couple to a first IV bag, and with the pharmaceutical waste system further comprising a second pharmaceutical dispenser coupler configured to couple to a second IV bag, wherein said extraction stage comprises a manifold, said manifold comprising,
    one or more manifold inlets configured to receive the residual pharmaceutical composition from the first and second IV bags, and
    a manifold outlet configured to output the residual pharmaceutical composition received from the first and second IV bags to said pump.

12. The pharmaceutical waste system of claim 1 wherein said main housing further comprises a security mechanism configured to prevent unauthorized access to said extraction stage and said pharmaceutical waste treatment stage.

13. The pharmaceutical waste system as set forth in claim 1 wherein said extraction stage comprises a reservoir in fluid communication with said pharmaceutical waste treatment stage, with said reservoir upstream of said pharmaceutical waste treatment stage for temporarily storing the residual pharmaceutical composition extracted from the IV bag.

14. The pharmaceutical waste system of claim 1 further comprising a waste analysis stage in fluid communication with one of the extraction stage and the pharmaceutical waste treatment stage, with the waste analysis stage being configured to analyze an output or an input of one of the extraction stage and the pharmaceutical waste treatment stage.

* * * * *